United States Patent
Zhang

(10) Patent No.: US 10,321,352 B2
(45) Date of Patent: Jun. 11, 2019

(54) METHOD AND APPARATUS FOR TRAFFIC STEERING

(71) Applicant: Telefonaktiebolaget LM Ericsson (publ), Stockholm (SE)

(72) Inventor: Shunliang Zhang, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/549,309

(22) PCT Filed: Mar. 16, 2015

(86) PCT No.: PCT/CN2015/074315
§ 371 (c)(1),
(2) Date: Aug. 7, 2017

(87) PCT Pub. No.: WO2016/145600
PCT Pub. Date: Sep. 22, 2016

(65) Prior Publication Data
US 2018/0041914 A1   Feb. 8, 2018

(51) Int. Cl.
*H04W 28/02* (2009.01)
*H04W 28/08* (2009.01)
(Continued)

(52) U.S. Cl.
CPC ....... *H04W 28/0247* (2013.01); *H04W 28/08* (2013.01); *H04W 28/10* (2013.01);
(Continued)

(58) Field of Classification Search
CPC . H04W 28/0247; H04W 28/08; H04W 28/10; H04W 40/04
See application file for complete search history.

(56) References Cited

U.S. PATENT DOCUMENTS

| | | | |
|---|---|---|---|
| 2012/0023562 A1* | 1/2012 | Harp | H04L 63/102 726/7 |
| 2014/0089500 A1* | 3/2014 | Sankar | H04L 47/125 709/224 |

(Continued)

FOREIGN PATENT DOCUMENTS

CN   101729592 A   6/2010

OTHER PUBLICATIONS

3rd Generation Partnership Project, "Technical Specification Group Services and System Aspects; Study on Flexible Mobile Service Steering (FMSS) (Release 13)", 3GPP TR 22.808 V13.0.0, Sep. 2014, pp. 1-19.

*Primary Examiner* — Chi H Pham
*Assistant Examiner* — Weibin Huang
(74) *Attorney, Agent, or Firm* — Coats & Bennett, PLLC

(57) ABSTRACT

Embodiments of the present disclosure provide a method, apparatus and computer program for traffic steering. Particularly, a method is provided at a first service provisioning network operated by a first network operator for steering traffic from a second mobile network operated by a second network operator. The method comprises obtaining traffic steering information for the traffic from the second mobile network and generating, based at least on the traffic steering information, a traffic steering policy for the traffic from the second mobile network. The method also comprises informing the traffic steering policy to a traffic controller of the first service provisioning network so that the traffic controller steers the traffic from the second mobile network based on the traffic steering policy. Another method is provided for facilitating steering, within a service provisioning network operated by a first network operator, of traffic from a mobile network operated by a second network operator. The method comprises generating traffic steering information based at least on requirements from the mobile network and provid- (Continued)

ing the traffic steering information to the service provisioning network for generating a traffic steering policy for the traffic from the mobile network.

16 Claims, 11 Drawing Sheets

(51) Int. Cl.
    *H04W 28/10*     (2009.01)
    *H04W 40/04*     (2009.01)
    *H04L 12/707*     (2013.01)
    *H04W 16/08*     (2009.01)
    *H04W 36/22*     (2009.01)

(52) U.S. Cl.
    CPC ............. *H04W 40/04* (2013.01); *H04L 45/22* (2013.01); *H04W 16/08* (2013.01); *H04W 36/22* (2013.01)

(56) References Cited

U.S. PATENT DOCUMENTS

| | | | |
|---|---|---|---|
| 2014/0162629 A1* | 6/2014 | Tipton | H04W 24/02 455/423 |
| 2014/0177446 A1* | 6/2014 | Sun | H04L 45/38 370/236 |
| 2014/0204909 A1* | 7/2014 | Cheng | H04W 8/082 370/331 |
| 2014/0241153 A1* | 8/2014 | Chowdhury | H04L 45/04 370/230 |
| 2015/0215835 A1* | 7/2015 | Sirotkin | H04W 36/16 455/436 |
| 2015/0245226 A1* | 8/2015 | Lewallen | H04W 40/34 370/225 |
| 2015/0351024 A1* | 12/2015 | Jang | H04W 48/18 370/329 |
| 2016/0007268 A1* | 1/2016 | Jung | H04W 48/08 370/338 |

* cited by examiner

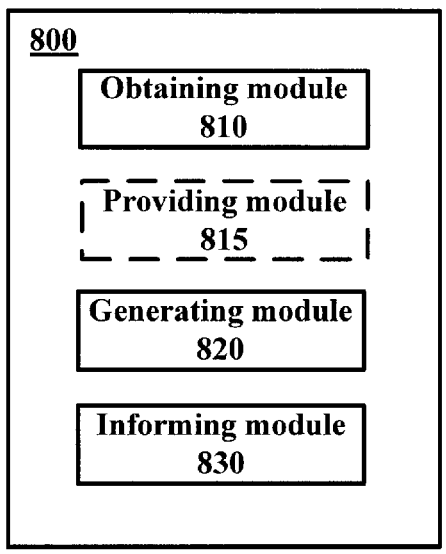
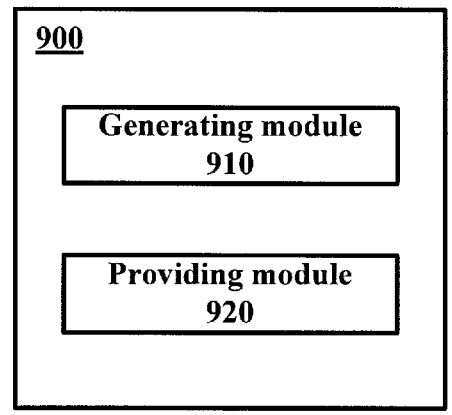
FIG. 8          FIG. 9
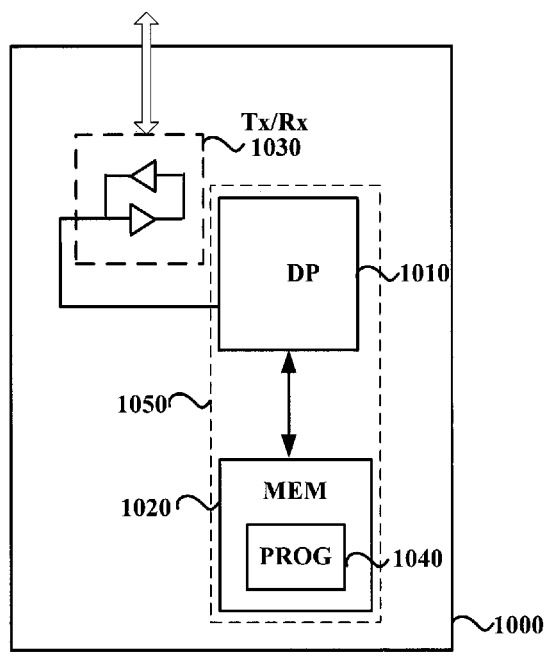
FIG. 10

METHOD AND APPARATUS FOR TRAFFIC STEERING

TECHNICAL FIELD

The non-limiting and exemplary embodiments of the present disclosure generally relate to communications networks, and specifically to a method, an apparatus, and a computer program for steering traffic within a value added service provisioning network.

BACKGROUND

This section introduces aspects that may facilitate better understanding of the present disclosure. Accordingly, the statements of this section are to be read in this light and are not to be understood as admissions about what is in the prior art or what is not in the prior art.

With the quick development of various Smartphone applications and machine to machine (M2M) applications, mobile network operators are marginalizing as dump "pipe" providers in the mobile internet era. Therefore, most network operators are trying to explore a new business model and increase revenue by providing users with various value added services (VAS services), such as security protection, anti-advertisement, video optimization, Web cache, Hyper-Text Transfer Protocol (HTTP) header enrichment, Transmission Control Protocol (TCP)/HTTP optimization and the like. Usually, one or more VAS services are applied to user's traffic based on different business considerations. It is not necessary that all VAS services are applied to all users' traffic at any condition. Meanwhile, with the inspiration of Cloud technology's success in the Information Technology (IT) world, the telecom industry is considering to provide Cloud based network services by Network Functions Virtualization (NFV) initiative at European Telecommunications Standards Institute (ETSI). The NFV technology will make it more flexible and efficient to provide and operate virtual mobile network services, as well as VAS services, which will accelerate the growth of the virtual network operator business.

Traditionally, the topology of VAS enablers associated with an Access Point Name (APN) is usually static, even fixed and chained. Adding/deleting a VAS enabler or changing the logic configuration of a service chain means a change of the network topology, which may result in many issues. The emerging of Software Defined Networking (SDN) technology is widely recognized as a potential approach to steer user's traffic across different VAS enablers in a flexible way. In the context of Third Generation Partnership Project (3GPP) mobile networks and virtual mobile network operators, it is important for the SDN technology to flexibly steer traffic for native users of a mobile network operator and traffic for users of its associated virtual network operator, for example, by taking into account preferences of both the Public Land Mobile Network (PLMN) operator and the virtual PLMN operator.

FIG. 1A and FIG. 1B illustrate two possible use cases of the cooperation between a Mobile Virtual Network Operator (MVNO) and its associated Mobile Network Operator (MNO) on VAS provision.

FIG. 1A shows a first use case, i.e. MNO based VAS provision. In this use case, the virtual operator MVNO A1 operates its own network, including a radio access network (RAN) and a core network (CN) but doesn't own any physical service provisioning infrastructure resources. The MVNO A1 provides normal network services to its users but doesn't provide VAS services. The VAS services are provided by its associated mobile network operator MNO A. Based on a business agreement between the MNO A and MVNO A1, users' traffic from the network operated by the MVNO A1 may be steered within the VAS provisioning network, e.g. an SGi local area network (SGi-LAN), operated by the MNO A and applied with various VAS services by the MNO A.

FIG. 1B shows a second use case, i.e. joint VAS provision. In the NFV and Cloud era, it is highly possible that a mobile network operator, e.g. MNO A, may provide part of infrastructure resources to a third party mobile virtual operator. The virtual operator, e.g. MVNO A1, operates its own network, including a RAN and a CN and may provide both normal network services and VAS services. In this use case, the MVNO A1 and MNO A jointly provide VAS services to both of their user groups. Based on a business agreement between the MNO A and MVNO A1, users' traffic from the network operated by the MVNO A1 may be steered to the VAS provisioning network, e.g. SGi-LAN, operated by the MNO A and applied with specific VAS services by the MNO A, while user's traffic from the network operated by the MNO A may also be steered to the VAS provisioning network operated by the MVNO A1 (not shown) and applied with specific VAS services by the MVNO A1.

In the practical network environment, a typical scenario is that a mobile network operator can provide different VAS services to its native users as well as users of its associated virtual network operator, while the policies on VAS provision for different user groups may be different. For example, the mobile network operator may differentiate a native user and a user of the associated virtual network operator when provisioning VAS services. Some VAS services are only applied to native users, while other VAS services are applied to both native users and virtual operator's users. Therefore, there is a need for a mechanism that may steer traffic of different users within a VAS provisioning network so as to satisfy different preferences or requirements of network operators and the users.

Regarding traffic steering in a Gi/SGi-LAN, there is an ongoing discussion in 3GPP. Currently, related use cases and requirements were captured by SA1 at TR 3GPP TR 22.808 V13.0.0, and discussions on possible solutions and architectures to potential issues haven't been initiated in SA2. So far, there are only a few disclosed solutions for basic flexible traffic steering. As to traffic steering for virtual network operator users, there is not any discussion.

In ETSI, the NFV frame has been defined, but little discussion about traffic steering for mobile virtual network operators.

In some communications companies, there have already been studies and trials on SDN based service chaining over mobile networks. For example, flexible traffic steering for mobile network users has been developed based on the following information: user's subscriptions, users' traffic destinations, network performance/quality of service (QoS), and application names/identities (IDs). But so far, there is little consideration about traffic steering for mobile virtual network scenarios. The existing traffic steering solutions can't be applied to mobile virtual network operator users.

SUMMARY

Various embodiments of the present disclosure mainly aim at providing a flexible and efficient method and apparatus for steering traffic for mobile virtual network users. Other features and advantages of embodiments of the present disclosure will also be understood from the following description of specific embodiments when read in conjunction with the accompanying drawings, which illustrate, by way of example, the principles of embodiments of the present disclosure.

In a first aspect of the disclosure, there is provided a method at a first service provisioning network operated by a first network operator for steering traffic from a second mobile network operated by a second network operator. The method comprises obtaining traffic steering information for the traffic from the second mobile network and generating, based at least on the traffic steering information, a traffic steering policy for the traffic from the second mobile network. The method also comprises informing the traffic steering policy to a traffic controller of the first service provisioning network so that the traffic controller steers the traffic from the second mobile network based on the traffic steering policy.

By means of this method, the service provisioning network operated by a network operator may obtain the traffic steering information regarding users of another network operator and thereby can flexibly determine a suitable traffic steering policy for the users of the other network operator so as to steer the traffic of these users appropriately within the service provisioning network.

In an embodiment, the first network operator may be a mobile network operator, while the second network operator may be a mobile virtual network operator. In this embodiment, the second network operator may not own any physical service provisioning infrastructure resources but can provide services to its own users or other users by relying on the physical service provisioning infrastructure resources owned by the first network operator.

In another embodiment, the traffic steering information may be obtained from a support system supporting business and operations of the second network operator that generates the traffic steering information based at least on requirements from the second mobile network.

In a further embodiment, the traffic steering information may comprise at least any of: a public land mobile network identity of the second network operator; one or more international mobile subscriber identification numbers of one or more users in the second mobile network; a type(s) and/or name(s) of a service(s) available at the first service provisioning network, for example in the form of a list; a service provision policy applied in the first service provisioning network; and a condition for applying the service provision policy.

In yet another embodiment, the second network operator may operate a second service provisioning network. In this embodiment, the traffic steering information may be obtained at least partially from preference information provided by the second service provisioning network for a user of the second mobile network that is permitted for accessing the first service provisioning network.

In a further embodiment, the first network operator may operate a first mobile network. The method may further comprise providing the second service provisioning network with preference information for a user of the first mobile network that is permitted for accessing the second service provisioning network.

In yet another embodiment, the preference information may comprises at least any of: a service provision preference of the corresponding user; a service provision preference of the corresponding mobile network operator for the corresponding user; a condition for applying the service provision preference; subscription information of the corresponding user; traffic description information of the corresponding user's traffic; an identity or Internet Protocol address of the corresponding user; and a public land mobile network identity of the corresponding mobile network; a type(s) and/or name(s) of a service(s) available at the corresponding service provisioning network, for example, in the form of a list.

Since the preference information of users of the mobile network operated by a network operator may be obtained in time by another network operator that will provide services for the users, the traffic steering policy determined by the other network operator may dynamically and reasonably reflect users' requirements.

In yet another embodiment, services provided by the second service provisioning network may be value added services. The second service provisioning network may be a software defined network comprising a plurality of value added service enablers.

In yet another embodiment, services provided by the first service provisioning network may be value added services. The first service provisioning network may be a software defined network comprising a plurality of value added service enablers.

In a second aspect of the disclosure, there is provided a method for facilitating steering, within a service provisioning network operated by a first network operator, of traffic from a mobile network operated by a second network operator. The method comprises generating traffic steering information based at least on requirements from the mobile network and providing the traffic steering information to the service provisioning network for generating a traffic steering policy for the traffic from the mobile network.

In an embodiment, the first network operator may be a mobile network operator; and the second network operator may be a mobile virtual network operator.

In another embodiment, the traffic steering information may comprise at least any of: a public land mobile network identity of the second network operator; one or more international mobile subscriber identification numbers of one or more users in the second mobile network; a type(s) and/or name(s) of a service(s) available at the first service provisioning network, for example in the form of a list; a service provision policy applied in the service provisioning network; and a condition for applying the service provision policy.

In yet another embodiment, the traffic steering information may be generated based on the requirements from the mobile network and a business agreement between the first network operator and the second network operator.

In a further embodiment, services provided by the service provisioning network are value added services. The service provisioning network is a software defined network comprising a plurality of value added service enablers.

In a third aspect of the disclosure, there is provided an apparatus at a first service provisioning network operated by a first network operator for steering traffic from a second mobile network operated by a second network operator. The apparatus comprises an obtaining module configured to obtain traffic steering information for the traffic from the second mobile network and a generating module configured to generate, based at least on the traffic steering information, a traffic steering policy for the traffic from the second mobile network. The apparatus also comprises an informing module configured to inform the traffic steering policy to a traffic controller of the first service provisioning network so that the traffic controller steers the traffic from the second mobile network based on the traffic steering policy.

In a fourth aspect of the disclosure, there is provided an apparatus for facilitating steering, within a first service provisioning network operated by a first network operator, of traffic from a second mobile network operated by a second network operator. The apparatus comprises a generating module configured to generate traffic steering information based at least on requirements from the second mobile network and a providing module configured to provide the traffic steering information to the first service provisioning network for generating a traffic steering policy for the traffic from the second mobile network.

In a fifth aspect of the disclosure, there is provided an apparatus at a first service provisioning network operated by a first network operator for steering traffic from a second mobile network operated by a second network operator. The apparatus comprises a processor and a memory. The memory containing instructions executable by the processor, whereby the apparatus is operative to perform the method according to the first aspect of the present disclosure.

In a sixth aspect of the disclosure, there is provided an apparatus for facilitating steering, within a first service provisioning network operated by a first network operator, of traffic from a second mobile network operated by a second network operator. The apparatus comprises a processor and a memory. The memory contains instructions executable by the processor, whereby the apparatus is operative to perform the method according to the second aspect of the present disclosure.

In a seventh aspect of the disclosure, there is provided an apparatus at a first service provisioning network operated by a first network operator for steering traffic from a second mobile network operated by a second network operator. The apparatus comprises processing means adapted to perform the method according to the first aspect of the present disclosure.

In an eighth aspect of the disclosure, there is provided an apparatus for facilitating steering, within a first service provisioning network operated by a first network operator, of traffic from a second mobile network operated by a second network operator. The apparatus comprises processing means adapted to perform the method according to the second aspect of the present disclosure.

In a ninth aspect of the disclosure, there is provided a computer program. The computer program comprises instructions which, when executed on at least one processor, cause at least one processor to carry out the method according to the first aspect of the present disclosure.

In a tenth aspect of the disclosure, there is provided a computer program. The computer program comprises instructions which, when executed on at least one processor, cause at least one processor to carry out the method according to the second aspect of the present disclosure.

According to the various aspects and embodiments as mentioned above, an effective and flexible solution or architecture is provided for steering traffic of mobile virtual network users within a service provisioning network operated by an associated mobile network operator by considering both requirements of the mobile virtual network operator and the associated mobile network operator. Also, the proposed architecture is in line with the 3GPP network architecture and the existing SDN reference architecture. Further, the proposed solution is simple and feasible from the product implementation perspective and may not impact implementations of user terminals.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure, in which:

FIG. 8 illustrates a schematic block diagram of an apparatus 800 adapted for traffic steering according to an embodiment of the present disclosure;

FIG. 9 illustrates a schematic block diagram of an apparatus 900 for facilitating steering, within a service provisioning network, of traffic from another mobile network according to an embodiment of the present disclosure;

FIG. 10 illustrates a schematic block diagram of an apparatus 1000 that may be embodied at a service provisioning network according to an embodiment of the present disclosure.

DETAILED DESCRIPTION

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to limit the embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Figure 1A:
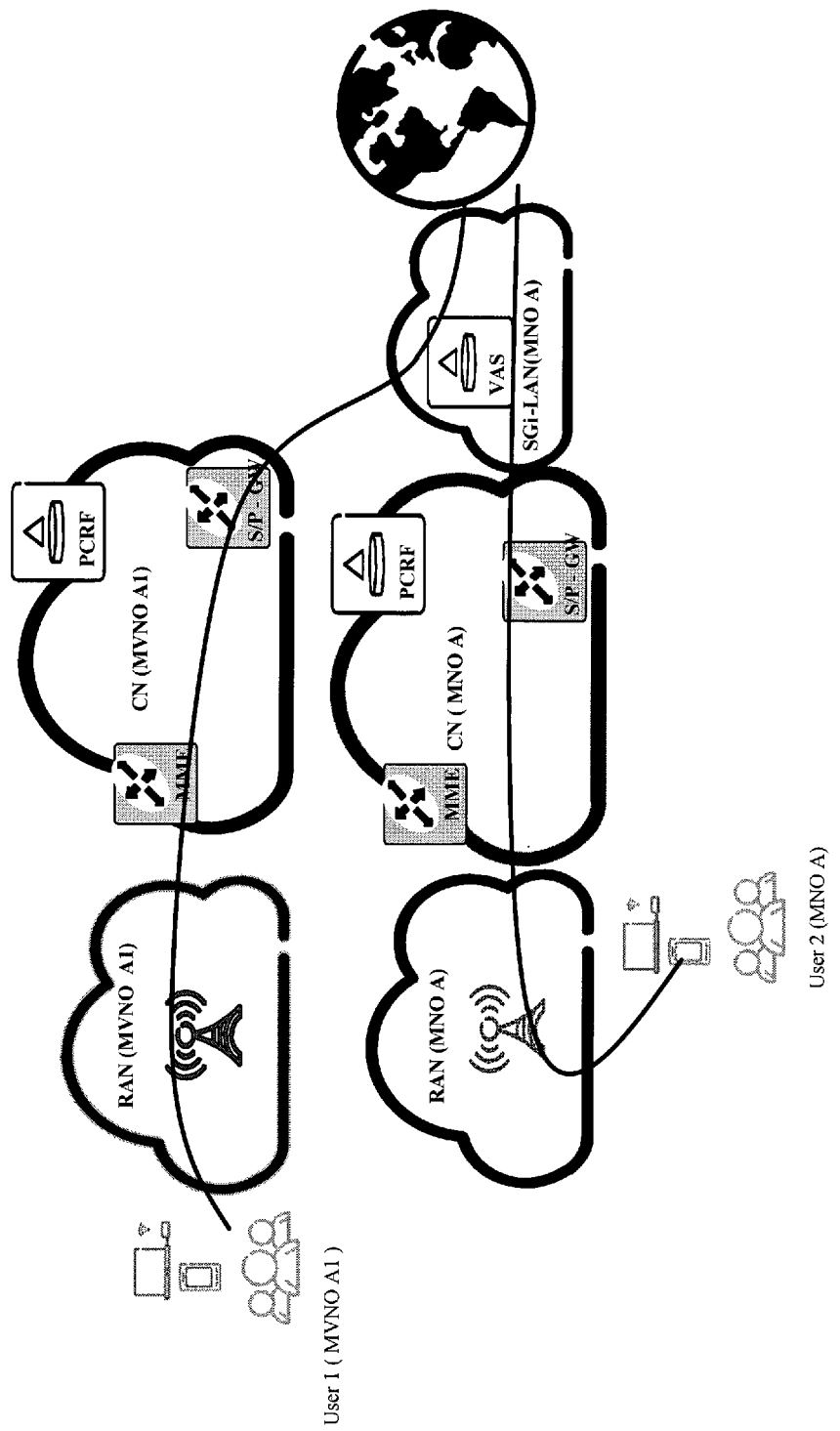
FIG. 1A and FIG. 1B illustrates two possible use cases of the cooperation between an MVNO and its associated MNO on VAS provision.
Figure 1B:
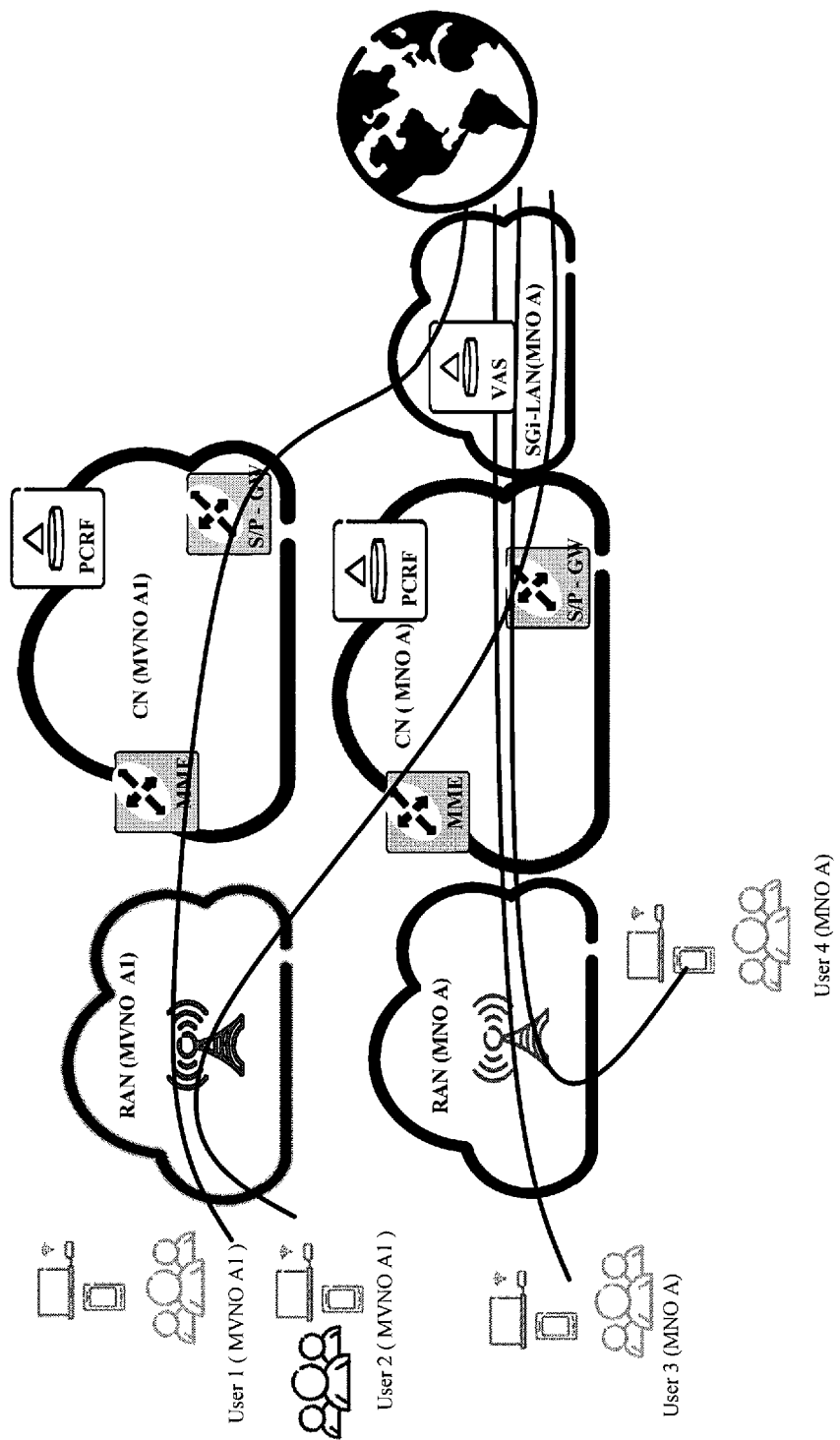

For illustrative purposes, the concept and principle of several embodiments of the present disclosure will be described in the context of use cases as illustrated in FIG. 1A and FIG. 1B. Those skilled in the art will appreciate, however, that the concept and principle of the several embodiments of the present disclosure may be more generally applicable to other use cases that may involve mobile virtual networks.

Figure 2A:
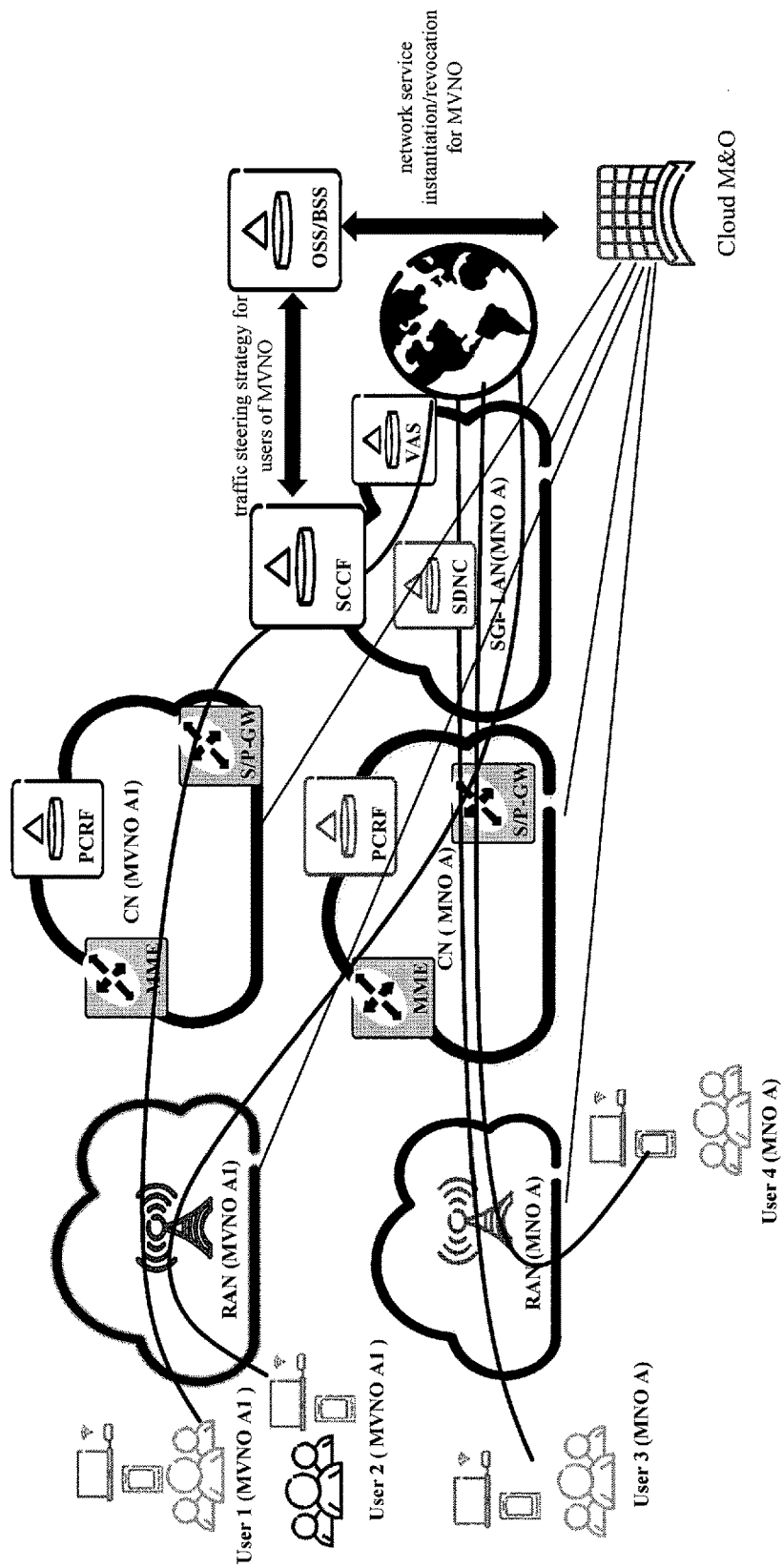
FIG. 2A and FIG. 2B schematically illustrate two example solutions for traffic steering with regard to two use cases as illustrated in FIG. 1A and FIG. 1B, respectively according to embodiments of the present disclosure.

FIG. 2A illustrates an example solution for traffic steering with regard to the first use case of FIG. 1A according to an embodiment of the present disclosure.

In the embodiment as illustrated in FIG. 2A, two network operators operate two networks. Particularly, a first network operator, e.g. a mobile network operator MNO A, operates a first network, including a first mobile network, i.e. a radio access network RAN, a core network CN and a service provisioning network, such as a SDN based chaining network, e.g. a Gi or SGi service LAN; and a second network operator, e.g. a mobile virtual network operator MVNO A1, operates a second network, including a second mobile network, i.e. a radio access network RAN and a core network CN. The second network operator may not own any physical service provisioning infrastructure resources but may operate the second network and provide normal services to its users by replying on the physical service provisioning infrastructure resources of the first network operator. The service provisioning network operated by the first network operator MNO A may provide special services, e.g. VAS services, to users of both the first network operator MVN A and the second network operator MVNO A1.

In the illustrated embodiment, each network operator may correspond to a support system, e.g. Operations Support System (OSS)/Business Support System (BSS), which supports operations/business of the corresponding network operator. In FIG. 2A, only the support system corresponding to the second mobile network operator MVNO A1 is shown.

In this embodiment, the support system may be enhanced to generate a traffic steering strategy for users, e.g. User 1 and User 2, of the second mobile network operator MVNO A1, for example based on requirements from the second mobile network operator MVNO A1, a business agreement between the first mobile network operator MNO A and the second mobile network operator MVNO A1, and/or a virtual network service provision status as informed by a Cloud Management and Orchestration system.

The support system may also provide traffic steering information regarding the generated traffic steering strategy for the users of the second mobile network operator MVNO A1 to a traffic controller function of the service provisioning network operated by the first mobile network operator MNO A, which may generate a traffic steering policy for the users of the second mobile network operator MVNO A1 based at least on the traffic steering information.

The traffic controller function may be a Service Chaining Controller Function (SCCF) in the case of a SDN based chaining network. The SCCF is one application in the Application Plane of the SDN based chaining network. It may provide the following functionality, for example, offering an interface to configure service chains, traffic types, mapping of the traffic types to the service chains, or a static filter, and a filter to service chain association, and passing information down to the Control Layer of the SDN based chaining network. The SCCF may allow traffic belonging to specific service chains to traverse only the required VAS enablers and also enable service chaining optimization and automation of broadband service activation by configuring software and hardware forwarding elements according to broadband policies. A person skilled in the art shall understand that the functionality of the SCCF is not limited by a specific term for naming it, for example, this function may equivalently be termed as Broadband Service Controller (BBSC) in some instances.

The traffic controller function may inform the generated traffic steering policy to a traffic controller, e.g. a SDN controller, of the first service provisioning network, which then translates the requirements according to the traffic steering policy from the traffic controller function into switch configuration instructions, such as Openflow configurations for an Openflow Switch (OFS). Accordingly, the OFS may steer the traffic of the users of the second mobile network operator MVNO A1 to specific service enablers, e.g. VAS enablers, within the service provisioning network as instructed by the traffic steering policy.

Figure 3:
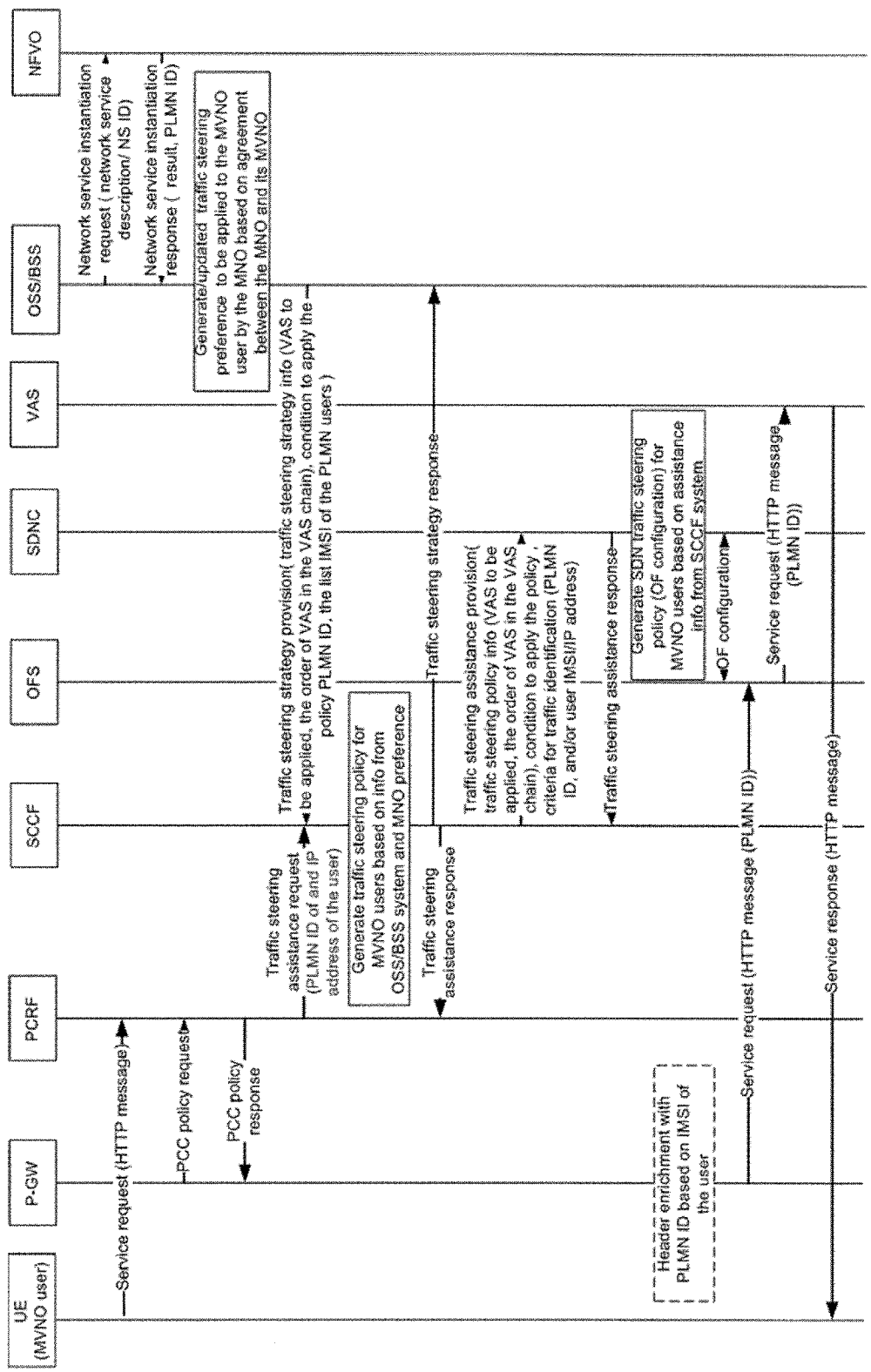
FIG. 3 illustrates an example message flow among specific entities for enabling service provision for MVNO users by applying the traffic steering solution according to the embodiment of the present disclosure as illustrated above with reference to FIG. 2A.

FIG. 3 illustrates an example message flow among various entities for enabling service provision for MVNO users by applying the traffic steering solution according to the embodiment of the present disclosure as illustrated above with reference to FIG. 2A. In order to simplify the description, the various entities will be referred to with abbreviations as illustrated in FIG. 3. Those skilled in the art, however, shall understand that these abbreviated references will not limit the scope of the present disclosure.

As illustrated in FIG. 3, firstly, based on requirements from the MVNO which may correspond to the second network operator as described above, the corresponding support system OSS/BSS may enable a specific network service for the MVNO by sending a message to a Network Functions Virtualization Orchestrator (NFVO) of the Cloud Management and Orchestration system. The message indicates a specific network service to be initiated.

Upon receipt of the message, the Cloud Management and Orchestration system may allocate necessary infrastructure resources for the specific network service and inform the support system OSS/BSS that the specific network service has been deployed, and may also provide the support system with a PLMN ID allocated to the MVNO. Hereafter, the PLMN ID allocated to a mobile virtual network operator may be specifically referred as a Virtual PLMN ID (VPLMN ID).

Subsequently, or in parallel, based at least on the requirements from the MVNO, the support system OSS/BSS may generate a traffic steering strategy to be applied to the MVNO users by the service provisioning network operated by the MNO which may correspond to the first network operator as described above. Additionally, the generation of the traffic steering strategy may be based further on a business agreement between the MNO and the MVNO. The traffic steering strategy based on the business agreement may be obtained through information exchange between two support systems corresponding respectively to the MNO and the MVNO.

Next, the support system OSS/BSS may send a message to the traffic controller function SCCF of the service provisioning network operated by the MNO, including information regarding the generated traffic steering strategy to be applied to the traffic of the MVNO users.

The information regarding the traffic steering strategy may include, but not limited to: the VPLMN ID of the MVNO; one or more international mobile subscriber identification (IMSI) number(s) of corresponding one or more users in the mobile network operated by the MVNO; a type(s) and/or name(s) of a service(s) available at the service provisioning network, for example in the form of a list; a service provision policy applied in the service provisioning network operated by the MVNO; and a condition for applying the service provision policy. In the case of a SDN based service provisioning network, the service provision policy may comprise VAS services to be applied and the order of VAS services in a VAS chain. The condition for applying the policy may comprise time, places, accessed applications, user categories and the like.

On the user side, an MVNO user may select a specific access network, and/or core network IP interface, and then send a service request to an application server.

Upon detecting the service request, the Policy and Charging Enforcement Function (PCEF) collocated with the PDN Gateway (P-GW) of the MVNO may send a request message to the Policy and Charging Rules Function (PCRF) of the MVNO to get a QoS and charging policy.

In order to assist the traffic controller function SCCF of the service provisioning network operated by the MNO to generate the traffic steering policy, the PCRF may additionally provide some assistance information to the traffic controller function SCCF via a message which may include the PLMN ID of the user derived from the IMSI of the user. Correspondingly, the traffic controller function SCCF may reply to the PCRF with a response message to confirm whether the assistance information has been successfully received.

Based at least on the information regarding the traffic steering strategy from the support system OSS/BSS, the traffic controller function SCCF may generate a traffic steering policy for the MVNO user. Additionally, the generation of the traffic steering policy may be based further on the assistance info from the PCRF.

Then, the traffic controller function SCCF may provide the generated traffic steering policy to the traffic controller SDNC of the service provisioning network, e.g. a Gi or SGi service LAN, operated by the MNO. The traffic controller SDNC may steer the MVNO user related traffic within the service provisioning network, in which related service enablers, e.g. VAS enablers, are deployed, according to the traffic steering policy. The traffic steering policy may determine whether a specific service is applied to the MVNO user related traffic or not.

Particularly, the traffic controller SDNC may translate the traffic steering policy from the traffic controller function SCCF into specific switch configuration instructions, such as Openflow configurations and configures the OFS accordingly. Meanwhile, the P-GW may route the traffic from the MVNO user to the OFS in the service provisioning network. Then, according to the Openflow configurations from the traffic controller SDNC, the OFS may route the MVNO user related traffic to appropriate VAS enablers in the service provisioning network.

Figure 4:
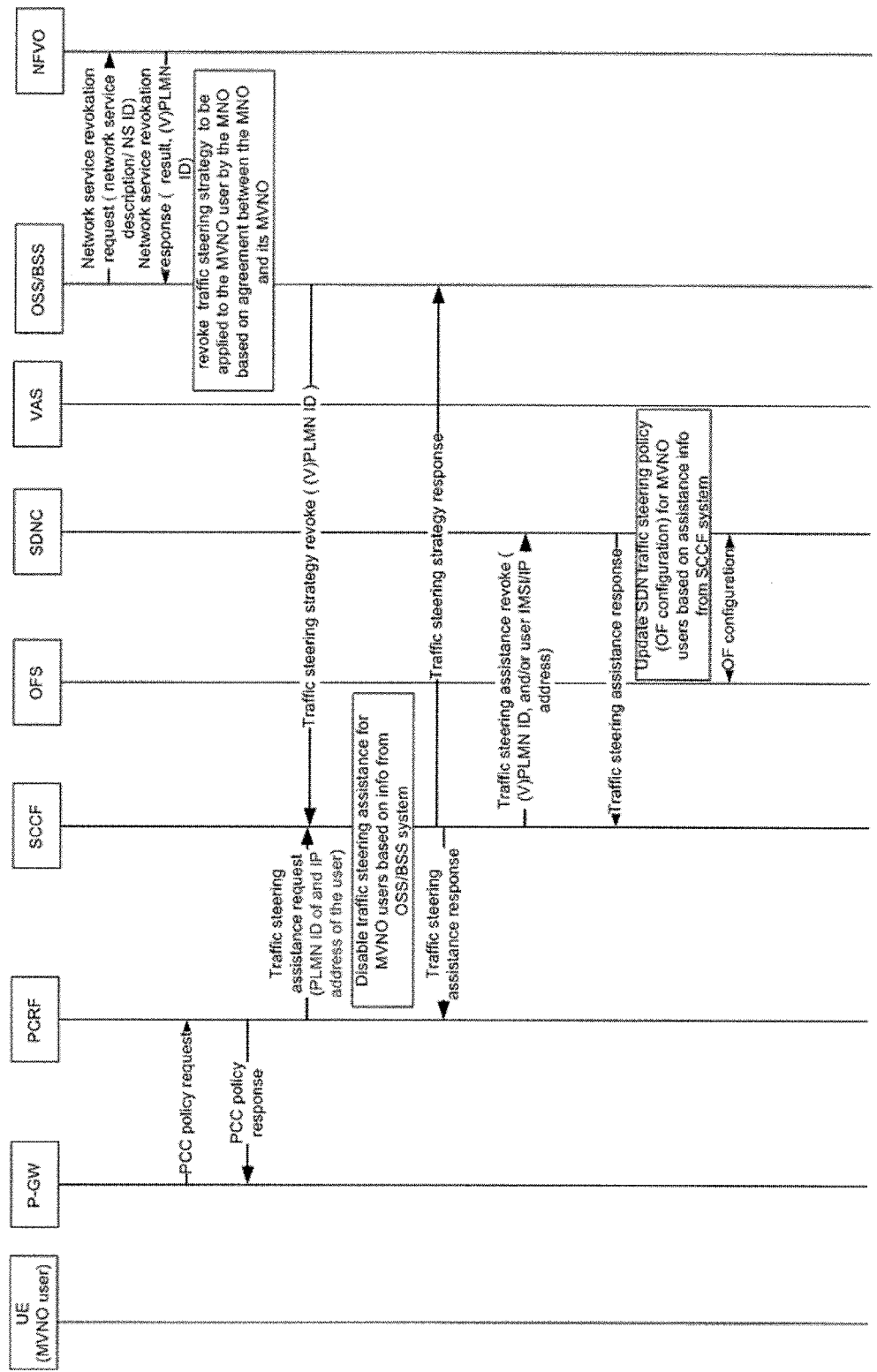
FIG. 4 illustrates another example message flow among specific entities for disabling service provision for MVNO users by applying the traffic steering solution according to the embodiment of the present disclosure as illustrated above with reference to FIG. 2A.

FIG. 4 illustrates another example message flow among various entities for disabling service provision for MVNO users by applying the traffic steering solution according to the embodiment of the present disclosure as illustrated above with reference to FIG. 2A. In order to simplify the description, the various entities will be referred to with abbreviations as illustrated in FIG. 4. Those skilled in the art, however, shall understand that these abbreviated references will not limit the scope of the present disclosure.

As illustrated, firstly, based on requirements from the MVNO which may correspond to the second network operator as described above, the support system OSS/BSS may disable a specific network service for the MVNO by sending a message to the NFVO of the Cloud Management and Orchestration system. This message indicates the specific network service to be revoked.

Then, the Cloud Management and Orchestration system may revoke the infrastructure resources and inform the support system OSS/BSS that the specific network service has been disabled.

Subsequently, or in parallel, based at least on the requirements from the MVNO, the support system OSS/BSS disables the generated traffic steering strategy for the MVNO users. The disabling of the generated traffic steering strategy may be based further on a business agreement between the MNO which may correspond to the first network operator as described above and the MVNO. The traffic steering strategy based on the business agreement may be obtained through information exchange between two support systems corresponding respectively to the MNO and the MVNO.

Next, the support system OSS/BSS may send a message to the traffic controller function SCCF of the service provisioning network operated by the MNO to disable the traffic steering strategy applied to the traffic of the MVNO users, i.e. the traffic from the mobile network operated by the MVNO.

On the other side, upon detecting that the specific network service is stopped or connection is released, the PCEF collocated with the P-GW may send a request message to the PCRF to update the QoS and charging policy.

In order to assist the traffic controller function SCCF to generate a new traffic steering policy, the PCRF may additionally provide some assistance information to the traffic controller function SCCF via a message which may include the PLMN ID of the user derived from the IMSI of the user. Correspondingly, the traffic controller function SCCF may reply to the PCRF with a response message to confirm whether the assistance information has been successfully received.

Based at least on the information regarding the disabled traffic steering strategy from the support system OSS/BSS, the traffic controller function SCCF of the service provisioning network operated by the MNO may revoke the traffic steering policy for the MVNO user. For example, the SCCF may identify a specific traffic steering policy to be disabled based on the PLMN ID of the user and the VPLMN ID included in the information regarding the traffic steering strategy from the support system. Additionally, the revocation of the traffic steering policy may be based further on the assistance info from the PCRF.

Then, the traffic controller function SCCF may disable the applied traffic steering policy for the traffic controller SDNC of the service provisioning network. The traffic controller may accordingly stop steering the MVNO user related traffic within the service provisioning network, in which related service enablers, e.g. VAS enablers, are deployed.

Particularly, the traffic controller SDNC may translate the disabled traffic steering policy from the SCCF into updated switch configuration instructions, such as Openflow configurations and provides updated Openflow configurations to the OFS under its control. Then, according to the Openflow configurations from the traffic controller SDNC, the OFS may stop routing the MVNO user related traffic to specific VAS enablers in the service provisioning network.

The above descriptions have introduced two specific implementations of the solution for traffic steering as illustrated in FIG. 2A with regard to the first use case of FIG. 1A. The solution for traffic steering with regard to the second use case of FIG. 1B will be described with reference FIG. 2B and FIG. 5 in the following.

Figure 2B:
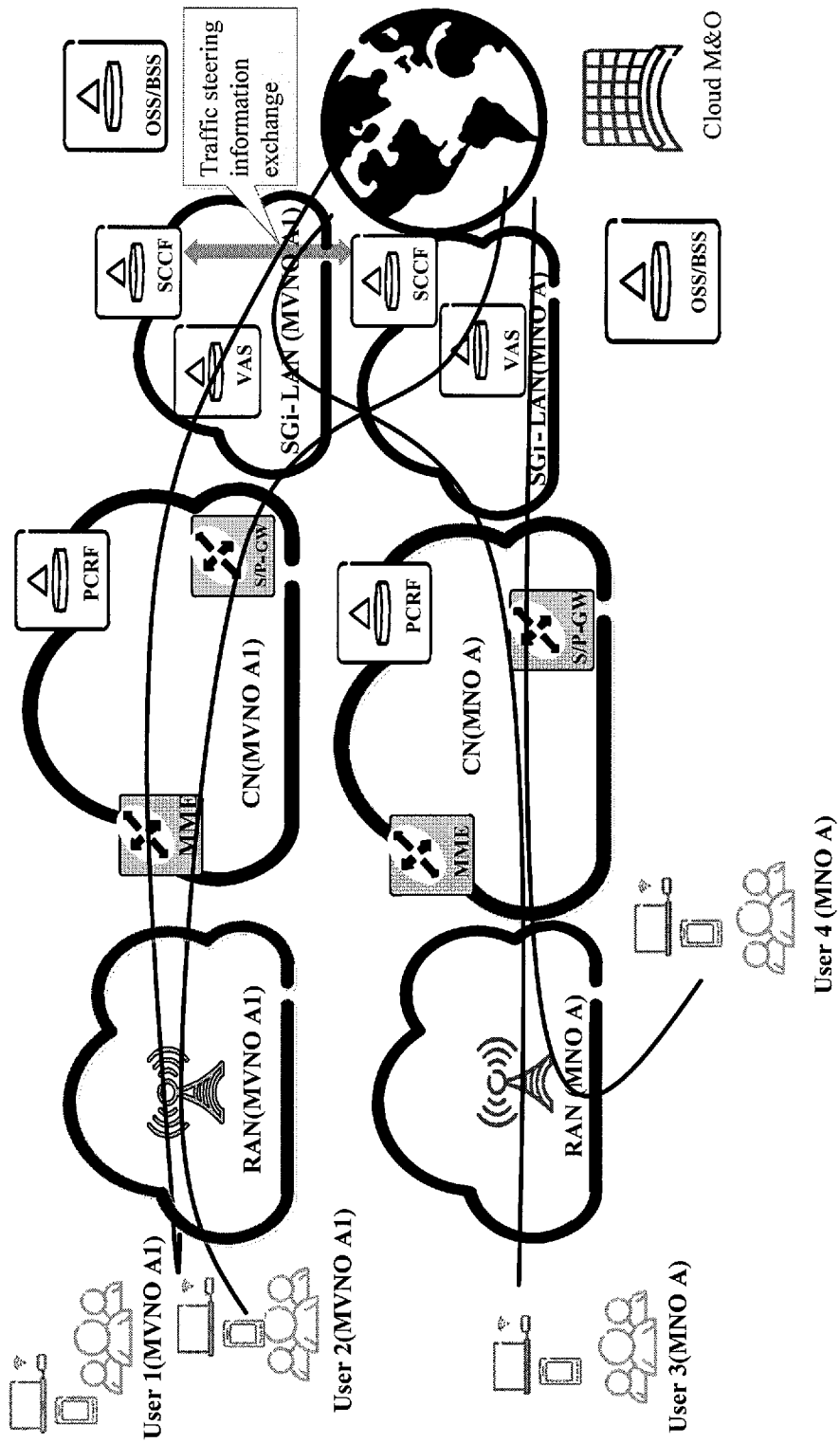

FIG. 2B illustrates an example solution for traffic steering with regard to the second use case of FIG. 1B according to an embodiment of the present disclosure.

In the illustrated embodiment, two network operators operate two networks. Particularly, a first network operator, e.g. a mobile network operator MNO A, operates a first network, including a first mobile network, i.e. a radio access network RAN, a core network CN and a first service provisioning network, such as a SDN based chaining network, e.g. a Gi or SGi service LAN; and a second network operator, e.g. a mobile virtual network operator MVNO A1 operates a second network, including a second mobile network, i.e. a radio access network RAN, a core network CN and a second service provisioning network, such as a SDN based chaining network, e.g. a Gi or SGi service LAN.

The second network operator may not own any physical service provisioning infrastructure resources but may operate the second network and provide normal services to its users by replying on the physical service provisioning infrastructure resources of the first network operator. The first service provisioning network operated by the first network operator may provide some special services, e.g. VAS services, to users of both the first network operator and the second network operator. The second service provisioning network operated by the second network operator may also provide some special services, e.g. VAS services, to users of both the first network operator and the second network operator.

Each of the first and second service provisioning networks comprises a traffic controller function, e.g. SCCF in the case of SDN based chaining network. In the illustrated embodiment, a new interface is introduced between the traffic controller function SCCF of the second network operator and the traffic controller function SCCF of the first network operator for exchanging traffic steering information and/or negotiating a traffic steering policy for their users, including the users of the first network operator that are allowed to access the special services, e.g. VAS services, provided by the second service provisioning network and/or the users of the second network operator that are allowed to access the special services, e.g. VAS services, provided by the first service provisioning network.

Hereafter, the network operator that provides special services, e.g. VAS services will be referred to as a hosting network operator. Likewise, any function or entity of the hosting network operator will be referred to as the hosting function or entity, e.g. the hosting traffic controller function or the hosting traffic controller. The network operator whose users access the special services, e.g. VAS services, provided by the hosting network operator will be referred to as a peer network operator. Likewise, any function or entity of the peer network operator will be referred to as the peer function or entity, e.g. the peer traffic controller function or the peer traffic controller. The mobile network operated by the peer network operator will be referred to as a peer mobile network.

The peer traffic controller function may provide information regarding preferences of users who are allowed to access the special services, e.g. VAS services, provided by the hosting network operator to the hosting traffic controller function. From the preference information, traffic steering information may be obtained. Based at least on the obtained traffic steering information, the hosting traffic controller function may generate a traffic steering policy on how the traffic from the peer mobile network is steered across the service provisioning network of the hosting network operator. Additionally, the generation of the traffic steering policy may be based further on possible Operation and Maintenance (OAM) configurations. The OAM configurations may include but not limited to: types and/or names of the VAS services available at the hosting service provisioning network; identification of a user group (e.g. the identification of a Very Important Person (VIP) user group); the VAS services to be provided to the user group; a condition to provide the VAS services to the user group; and a traffic template for identifying a specific user traffic for VAS provision.

The preference information with regard to a peer user may comprise but not limited to: a special service (e.g. VAS service) provision preference for the peer user, e.g. VAS services to be applied, the order of VAS services in a VAS chain; a condition for applying the service provision preference; subscription information of the peer user, e.g. a user category and the subscribed VAS services; an identity or IP address of the peer user; and a (V)PLMN ID of the corresponding mobile network; a type(s) and/or name(s) of a service(s) available at the corresponding service provisioning network, for example in the form of a list.

Then, the hosting traffic controller function may provide the traffic steering policy to the traffic controller of the hosting service provisioning network so as to steer the traffic from the peer mobile network accordingly.

In another embodiment, each network operator may correspond to a support system, e.g. OSS/BSS, that supports operations/business of the corresponding network operator. Similarly to the embodiment as illustrated in FIG. 2A, the support system of the peer network operator, e.g. MVNO A1, may provide additional traffic steering information, such as a traffic steering strategy, for the traffic from the peer mobile network, to the hosting network operator, e.g. MNO A, so as to facilitate the traffic controller function of the hosting network operator to generate a traffic steering policy for the traffic from the peer mobile network.

Then, the traffic controller of the hosting service provisioning network may translate the traffic steering requirements according to the traffic steering policy from the traffic controller function to Openflow configurations and configures the OFS accordingly so as to enable or disable steering traffic from/to users of the peer mobile network to appropriate service enablers based on the traffic steering policy.

Figure 5:
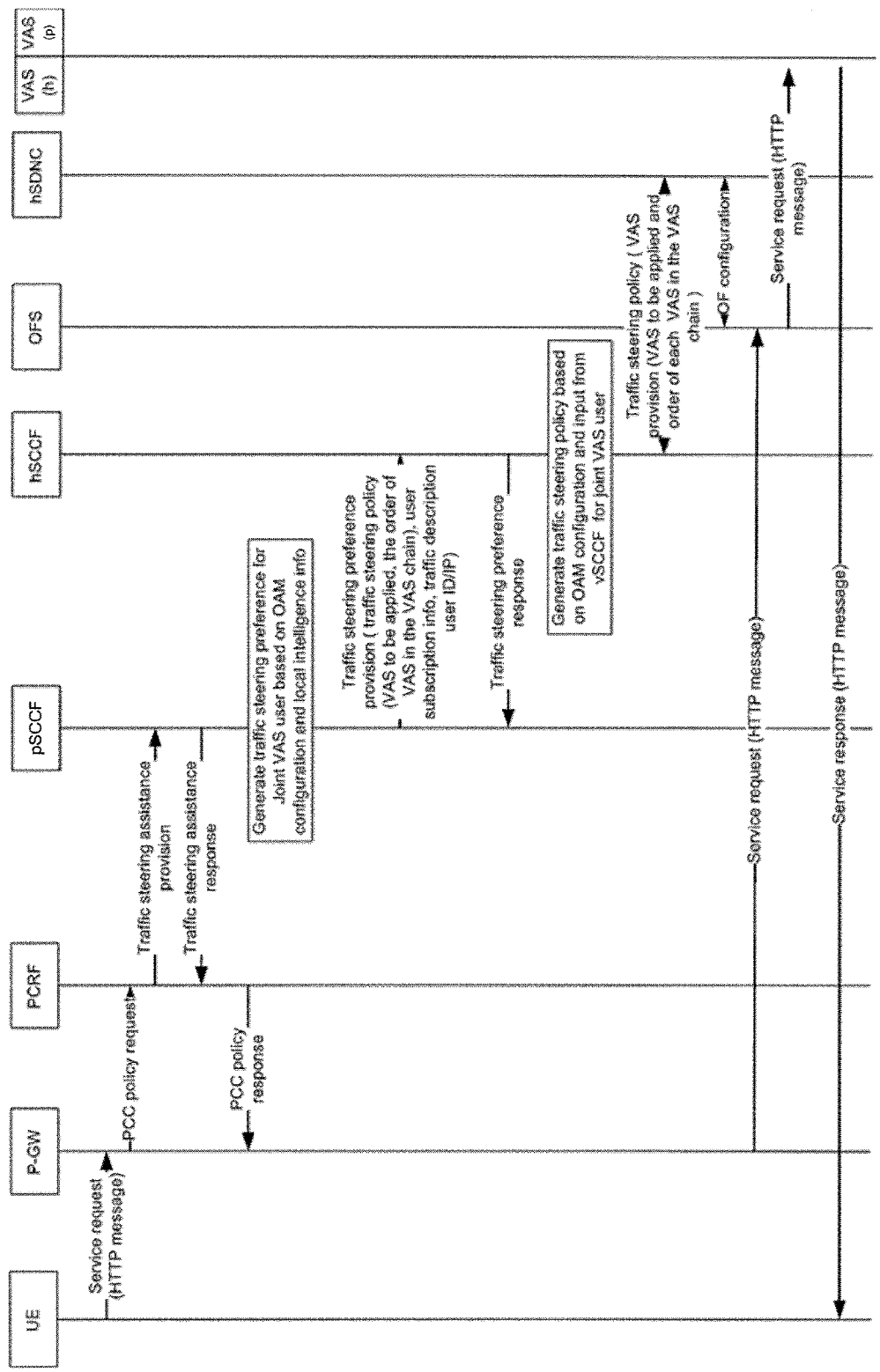
FIG. 5 illustrates an example message flow among various entities for service provision by applying the traffic steering solution according to the embodiment of the present disclosure as illustrated above with reference to FIG. 2B.

FIG. 5 illustrates an example message flow among various entities for service provision by applying the traffic steering solution according to the embodiment of the present disclosure as illustrated above with reference to FIG. 2B. In order to simplify the description, the various entities will be referred to with abbreviations as illustrated in FIG. 5. Those skilled in the art, however, shall understand that these abbreviated references will not limit the scope of the present disclosure.

As illustrated, firstly, an MVNO user selects a specific access network, and/or core network IP interface, and then sends a service request to an application server.

Upon detecting the user's service request, the PCEF collocated with the P-GW of the MVNO sends a request message to the PCRF of the MVNO to get a QoS and charging policy.

In order to assist the SCCF of the MVNO to generate a traffic steering policy, the PCRF may additionally provide assistance information to the SCCF via a message. The SCCF may reply to the PCRF with a response message to confirm whether the assistance info has been successfully received.

Based on some configuration information from the OSS/BSS system corresponding to the MVNO, and/or the assistance info from the PCRF, the SCCF of the MVNO may generate a traffic steering policy for the MVNO user.

In the case that the service provisioning network operated by the MVNO can't fulfill the requirement of the user, the SCCF of the MVNO (i.e. pSCCF in FIG. 5) may decide if services, e.g. VAS services, from the cooperated MNO can be used. Then, the pSCCF may generate information regarding traffic steering preferences of its user to access the services of the cooperated MNO, for example based on current network access information, such as the type of the access network of the user, the load of the access network, the location and time zone of the user, the APN accessed by the user, etc., and possible OAM configurations.

For example, the information regarding traffic steering preferences of an user may comprise but not limited to: a service provision preference of the user; a service provision preference of the MNO for the user; a condition for applying the service provision preference; subscription information of the user; traffic description information of the user's traffic; an identity or IP address of the user; and a PLMN ID of the corresponding mobile network; a type and/or name of the service available at the corresponding service provisioning network.

Then, the SCCF of the MVNO may provide the generated information regarding traffic steering preferences of its user to the SCCF of the MNO (i.e. hSCCF in FIG. 5) via a message. Correspondingly, the hSCCF of the MNO may reply to the pSCCF of the MVNO with a message to confirm whether the related information has been successfully received.

Subsequently, based on the information regarding traffic steering preferences from the peer SCCF, and possibly further on OAM configurations, and the preferences of users of the MNO, the SCCF of the MNO (or the hosting SCCF) may generate a traffic steering policy for steering the MVNO user related traffic across the service provisioning network of the MNO.

The SCCF of the MNO may provide the generated traffic steering policy to the traffic controller, which then steers the MVNO user related traffic within the service provisioning network, where related service enablers are deployed. The traffic steering policy determines whether a specific service is applied to the MVNO user related traffic or not.

Particularly, the traffic controller may translate the traffic steering policy from the SCCF into specific switch configuration instructions, such as Openflow configurations and configures the OFS accordingly. According to the Openflow configurations of the traffic controller, the OFS may route the MVNO user specific traffic to appropriate service enablers in the service provisioning network, e.g. the Gi/SGi service LAN.

Figure 6:
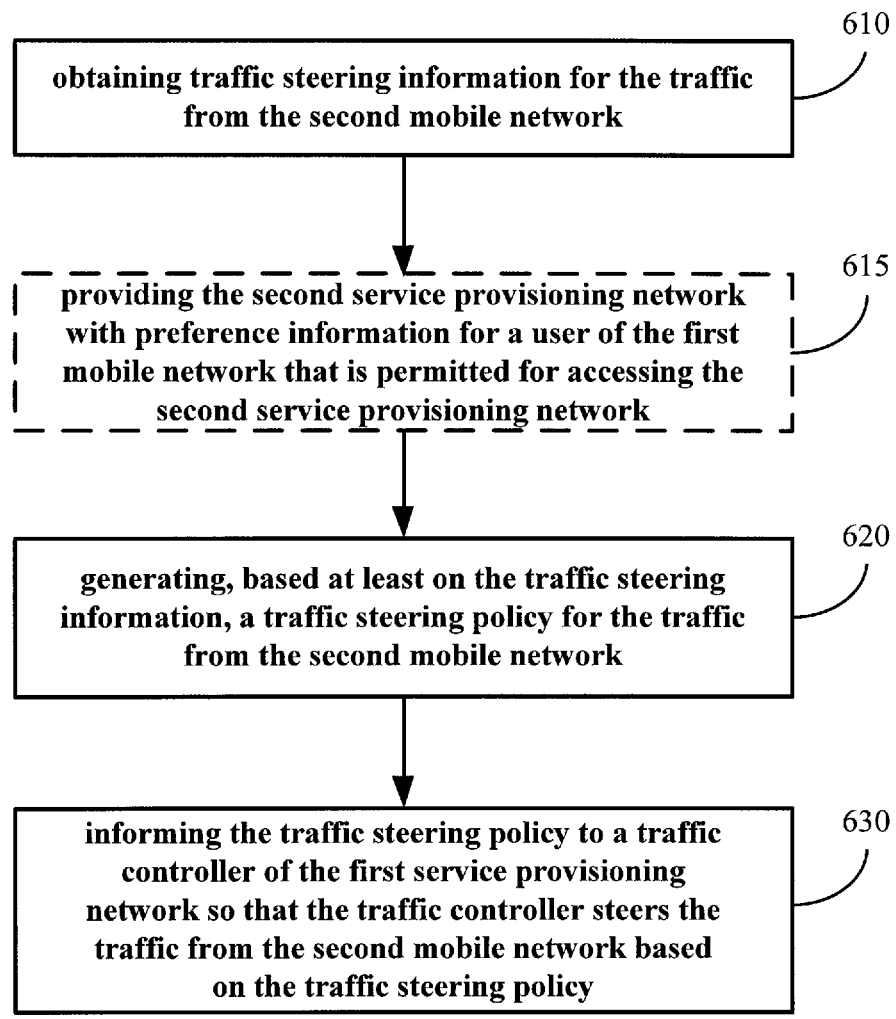
FIG. 6 illustrates a flowchart of an example method 600 for steering traffic according to an embodiment of the present disclosure.

FIG. 6 illustrates a flowchart of an example method 600 for steering traffic according to an embodiment of the present disclosure. The method 600 may be implemented at a service provisioning network (which will be referred to as a first service provisioning network hereafter), e.g. a SDN based chaining network comprising a plurality of VAS enablers and providing various VAS services, operated by a first network operator, e.g. a mobile network operator and used for steering traffic from a mobile network (which will be referred to as a second mobile network) operated by a second network operator, e.g. a mobile virtual network operator.

As illustrated, the method 600 is entered in block 610, in which traffic steering information for the traffic from the second mobile network is obtained. Then based at least on the traffic steering information, a traffic steering policy for the traffic from the second mobile network is generated in block 620. Subsequently, the traffic steering policy is informed in block 630 to a traffic controller of the first service provisioning network so that the traffic controller steers the traffic from the second mobile network based on the traffic steering policy.

In an embodiment, the traffic steering information may be obtained from a support system, e.g. OSS/BSS, supporting business and operations of the second network operator that generates the traffic steering information based at least on requirements from the second mobile network.

In particular, the traffic steering information may comprise at least any of: a public land mobile network identity of the second network operator; one or more international mobile subscriber identification numbers of corresponding one or more users in the second mobile network; a type(s) and/or name(s) of a service(s) available at the first service provisioning network, for example in the form of a list; a service provision policy applied in the first service provisioning network; and a condition for applying the service provision policy.

In a further embodiment, the second network operator may operate a second service provisioning network. As an example, the second service provisioning network may be a SDN based chaining network that comprises a plurality of VAS enablers and provides various VAS services. In this embodiment, the traffic steering information may be obtained at least partially from preference information provided by the second service provisioning network for a user of the second mobile network that is permitted for accessing the first service provisioning network.

In a further embodiment that the first network operator operates a first mobile network, the method 600 may also comprise providing in block 615 the second service provisioning network with preference information for a user of the first mobile network that is permitted for accessing the second service provisioning network.

In particular, the preference information may comprise at least any of: a service provision preference of the corresponding user; a service provision preference of the corresponding mobile network operator for the corresponding user; a condition for applying the service provision preference; subscription information of the corresponding user; traffic description information of the corresponding user's traffic; an identity or Internet Protocol address of the corresponding user; and a public land mobile network identity of the corresponding mobile network; a type and/or name of the service available at the corresponding service provisioning network.

Figure 7:
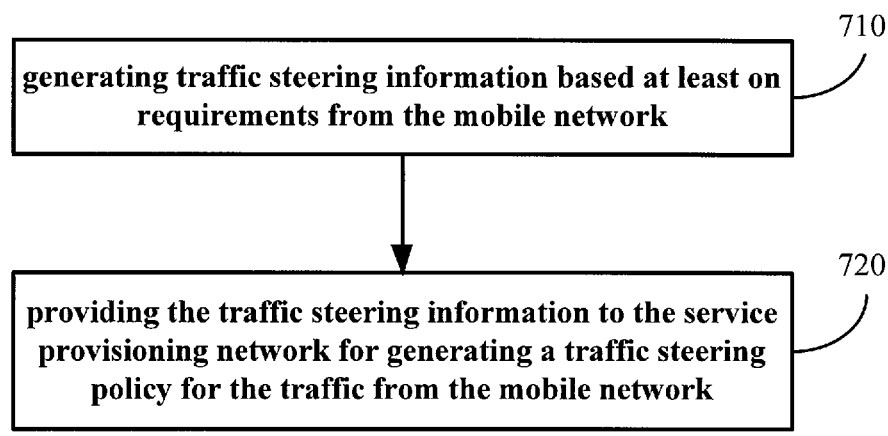
FIG. 7 illustrates a flowchart of an example method 700 for facilitating steering, within a service provisioning network, of traffic from another mobile network according to an embodiment of the present disclosure.

FIG. 7 illustrates a flowchart of an example method 700 for facilitating steering, within a service provisioning network, e.g. a software defined network comprising a plurality of value added service enablers and providing various VAS services, operated by a first network operator, e.g. a mobile network operator, of traffic from a mobile network operated by a second network operator, e.g. a mobile virtual network operator. The method 700 may be implemented at a support system supporting business and operations of the second network operator.

The method 700 is entered in block 710, in which traffic steering information is generated based at least on requirements from the mobile network. For example, the requirements may include the requirements from the first mobile network operator and the second mobile network operator, such as preferences for VAS service provision, a VAS service to be provided, who will provide the VAS service, e.g. whether a specific VAS will be provided by the service provisioning network operated by the first or second network operator, a condition for the VAS service provision, a user group ID or a user ID, and a traffic template for identifying a specific user traffic, which can be determined by an offline approach or an online approach by information exchange through interactive of the OSS/BSS systems. Additionally, the generation of the traffic steering information may be further based on a business agreement between the first network operator and the second network operator.

Then in block 720, the traffic steering information is provided to the service provisioning network for generating a traffic steering policy for the traffic from the mobile network.

In an embodiment, the traffic steering information may comprise at least any of: a public land mobile network identity of the second network operator; one or more international mobile subscriber identification numbers of one or more users in the second mobile network; a type(s) and/or name(s) of a service(s) available at the service provisioning network, for example in the form of a list; a service provision policy applied in the service provisioning network; and a condition for applying the service provision policy.

In another embodiment, the traffic steering information may be generated based on the requirements from the mobile network and a business agreement between the first network operator and the second network operator.

In a further embodiment, the service provisioning network may be a software defined network comprising a plurality of value added service enablers.

Although the operations of methods 600 and 700 are illustrated in FIGS. 6 and 7 in a specific order, a person skilled in the art shall understand that some operations may be performed in a reverse order or in parallel. For example, the operations in blocks 710 and 715 of FIG. 7 may be performed concurrently or in a reverse order. Therefore, the order specified in figures is merely illustrative instead of limiting.

FIG. 8 illustrates a schematic block diagram of an apparatus 800 adapted for traffic steering according to an embodiment of the present disclosure. The apparatus 800 may be embodied at a service provisioning network (which will be referred to as a first service provisioning network hereafter), e.g. a SDN based chaining network comprising a plurality of VAS enablers and providing various VAS services, operated by a first network operator, e.g. a mobile network operator and used for steering traffic from a mobile network (which will be referred to as a second mobile network) operated by a second network operator, e.g. a mobile virtual network operator.

Particularly, as illustrated in FIG. 8, the apparatus 800 comprises an obtaining module 810, a generating module 820, and an informing module 830. The obtaining module 810 is configured to obtain traffic steering information for the traffic from the second mobile network. The generating module 820 is configured to generate, based at least on the traffic steering information, a traffic steering policy for the traffic from the second mobile network. The informing module 830 is configured to inform the traffic steering policy to a traffic controller of the first service provisioning network so that the traffic controller steers the traffic from the second mobile network based on the traffic steering policy.

In an embodiment, the obtaining module 810 may be configured to obtain the traffic steering information from a support system supporting business and operations of the second network operator that generates the traffic steering information based at least on requirements from the second mobile network.

For example, the traffic steering information may comprise at least any of: a public land mobile network identity of the second network operator; one or more international mobile subscriber identification numbers of corresponding one or more users in the second mobile network; a type(s) and/or name(s) of a service(s) available at the first service provisioning network, for example in the form of a list; a service provision policy applied in the first service provisioning network; and a condition for applying the service provision policy.

In a further embodiment, the second network operator may operate a second service provisioning network. In such an embodiment, the obtaining module 810 may be configured to obtain the traffic steering information from preference information provided by the second service provisioning network for a user of the second mobile network that is permitted for accessing the first service provisioning network.

In another embodiment, the first network operator operates a first mobile network. In such an embodiment, the apparatus 800 may further comprise a providing module 815 that is configured to provide the second service provisioning network with preference information for a user of the first mobile network that is permitted for accessing the second service provisioning network.

As an example, the preference information may comprise at least any of: a service provision preference of the corresponding user; a service provision preference of the corresponding mobile network operator for the corresponding user; a condition for applying the service provision preference; subscription information of the corresponding user; traffic description information of the corresponding user's traffic; an identity or Internet Protocol address of the corresponding user; and a public land mobile network identity of the corresponding mobile network; one or more type and/or name of value added service available at corresponding service provisioning network.

In a further embodiment, the second service provisioning network may be a software defined network comprising a plurality of value added service enablers; and/or the first service provisioning network may be a software defined network comprising a plurality of value added service enablers.

The above modules may be configured to implement corresponding operations or steps as described with reference to FIG. 6 and thus will not be detailed herein for the conciseness purpose.

FIG. 9 illustrates a schematic block diagram of an apparatus 900 for facilitating steering, within a service provisioning network, e.g. a software defined network comprising a plurality of value added service enablers and providing various VAS services, operated by a first network operator, e.g. a mobile network operator, of traffic from a mobile network operated by a second network operator, e.g. a mobile virtual network operator. The apparatus 900 may be embodied at a support system that supports business and operations of the second network operator.

Particularly, the apparatus 900 comprises a generating module 910 configured to generate traffic steering information based at least on requirements from the second mobile network and a providing module 920 configured to provide the traffic steering information to the first service provisioning network for generating a traffic steering policy for the traffic from the second mobile network.

For example, the traffic steering information may comprise at least any of: a public land mobile network identity of the second network operator; one or more international mobile subscriber identification numbers of corresponding one or more users in the second mobile network; a type(s) and/or name(s) of a service(s) available at the service provisioning network, for example in the form of a list; a service provision policy applied in the first service provisioning network; and a condition for applying the service provision policy.

In an embodiment, the generating module 910 may be further configured to generate traffic steering information based on the requirements from the second mobile network and a business agreement between the first network operator and the second network operator.

In a further embodiment, the first service provisioning network may be a software defined network comprising a plurality of value added service enablers.

The above modules may be configured to implement corresponding operations or steps as described with reference to FIG. 7 and thus will not be detailed herein for the conciseness purpose.

FIG. 10 illustrates a schematic block diagram of an apparatus 1000 that may be embodied at a service provisioning network, e.g. a SDN based chaining network comprising a plurality of VAS enablers and providing various VAS services, operated by a first network operator, e.g. a mobile network operator and used for steering traffic from a mobile network operated by a second network operator, e.g. a mobile virtual network operator.

The apparatus 1000 comprises at least one processor 1010, such as a data processor (DP) and at least one memory (MEM) 1020 coupled to the processor 1010. The apparatus 1000 may further comprise a transmitter TX and receiver RX 1030 coupled to the processor 1010. The MEM 1020 stores a program (PROG) 1040. The PROG 1040 may include instructions that, when executed on the associated processor 1010, enable the apparatus 1000 to operate in accordance with the embodiments of the present disclosure, for example to perform the method 600. A combination of the at least one processor 1010 and the at least one MEM 1020 may form processing means 1050 adapted to implement some embodiments of the present disclosure.

Figure 11:
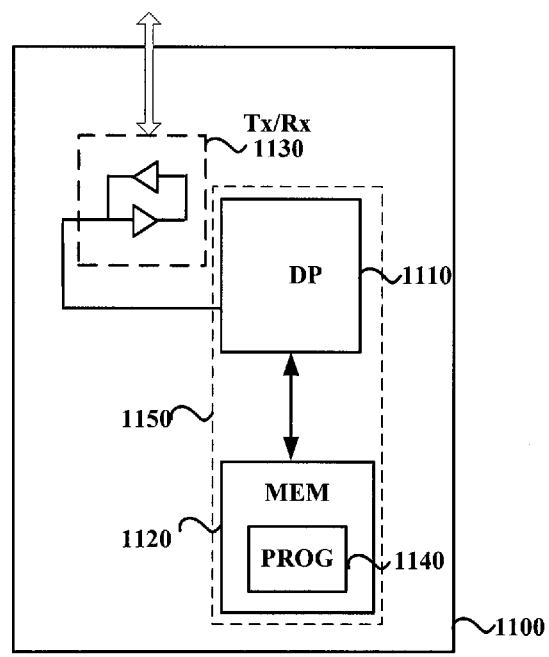
FIG. 11 illustrates a schematic block diagram of an apparatus 1100 that may be embodied at a support system according to an embodiment of the present disclosure.

FIG. 11 illustrates a schematic block diagram of an apparatus 1100 for facilitating steering, within a service provisioning network, e.g. a software defined network comprising a plurality of value added service enablers and providing various VAS services, operated by a first network operator, e.g. a mobile network operator, of traffic from a mobile network operated by a second network operator, e.g. a mobile virtual network operator. The apparatus 900 may be embodied at a support system that supports business and operations of the second network operator.

The apparatus 1100 comprises at least one processor 1110, such as a DP, and at least one MEM 1120 coupled to the processor 1110. The apparatus 1100 may further comprise a suitable TX/RX 1130 coupled to the processor 1120. The MEM 1120 stores a PROG 1140. The PROG 1140 may include instructions that, when executed on the associated processor 1120, enable the apparatus 1100 to operate in accordance with the embodiments of the present disclosure, for example to perform the method 700. A combination of the at least one processor 1110 and the at least one MEM 1120 may form processing means 1150 adapted to implement some embodiments of the present disclosure.

Various embodiments of the present disclosure may be implemented by computer program executable by one or more of the processors 1010 and 1110, software, firmware, hardware or in a combination thereof.

The MEMs 1020 and 1120 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 1010 and 1120 may be of any type suitable to the local technical environment, and may include one or more of general purpose computers, special purpose computers, microprocessors, digital signal processors DSPs and processors based on multicore processor architecture, as non-limiting examples.

Although the above description is made in the context of mobile virtual networks, it should not be construed as limiting the spirit and scope of the present disclosure. The principle and concept of the present disclosure may be more generally applicable to any environment that may involve steering of traffic from different networks.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method implemented by a policy controller in a value-added service (VAS provisioning network associated with a first mobile network operated by a first network operator, for steering traffic from a second virtual mobile network operated by a second network operator, the method comprising:
    obtaining, traffic steering information for the traffic from the second virtual mobile network;
    generating, based at least on the traffic steering information, a traffic steering policy for the traffic from the second virtual mobile network; and
    informing the traffic steering policy to a traffic controller of the VAS provisioning network so that the traffic controller steers the traffic from the second virtual mobile network based on the traffic steering policy to provide a differentiated service to the users of the second virtual mobile network.

2. The method of claim 1, wherein the traffic steering information is obtained from a support system supporting business and operations of the second network operator that generates the traffic steering information based at least on requirements from the second virtual mobile network.

3. The method of claim 2, wherein the traffic steering information comprises any of a public land mobile network identity of the second network operator, an international mobile subscriber identification number of a user in the second virtual mobile network; a type and/or name of a service available at the first VAS provisioning network; a service provision policy applied in the first VAS provisioning network; and a condition for applying the service provision policy.

4. The method of claim 1, wherein:
    a second VAS provisioning network is operated by the second network operator; and
    the traffic steering information is obtained at least partially from preference information provided by the second VAS provisioning network for a user of the second virtual mobile network that is permitted to access the first VAS provisioning network.

5. The method of claim 4
    further comprising providing the second VAS provisioning network with preference information for a user of the first mobile network that is permitted for accessing the second VAS provisioning network.

6. A method for facilitating steering, within a value-added service (VAS) provisioning network associated with a first mobile network operated by a first network operator, of traffic from a second virtual mobile network operated by a second network operator, the method comprising:
    generating traffic steering information based at least on requirements from the second virtual mobile network; and
    providing the traffic steering information to the first VAS provisioning network for generating a traffic steering policy for the traffic from the second virtual mobile network such that the first VAS provisioning network is enabled to provide differentiated VAS services to users of the first mobile network and users of the second virtual mobile network.

7. The method of claim 6, wherein the traffic steering information comprises any of: a public land mobile network identity of the second network operator; an international mobile subscriber identification number of a user in the second virtual mobile network; a type and/or name of a service available at the first VAS provisioning network; a service provision policy applied in the first VAS provisioning network; and a condition for applying the service provision policy.

8. The method of claim 6, wherein the generating traffic steering information comprises generating the traffic steering information based on the requirements from the mobile network and a business agreement between the first network operator and the second virtual mobile network operator.

9. A policy controller in a value-added service (VAS) provisioning network associated with a first mobile network operated by a first network operator, for steering traffic from a second virtual mobile network operated by a second network operator, the apparatus comprising:
    processing circuitry;
    memory containing instructions executable by the processing circuitry whereby the apparatus is operative to:
        obtain traffic steering information for the traffic from the second virtual mobile network;
        generate, based at least on the traffic steering information, a traffic steering policy for the traffic from the second virtual mobile network; and inform the traffic steering policy to a traffic controller of the VAS provisioning network so that the traffic controller steers the traffic from the second virtual mobile network based on the traffic steering policy to provide a differentiated service to the users of the second virtual mobile network.

10. The apparatus of claim 9, wherein the instructions are such that the apparatus is operative to obtain the traffic steering information from a support system supporting business and operations of the second network operator that generates the traffic steering information based at least on requirements from the second virtual mobile network.

11. The apparatus of claim 10, wherein the traffic steering information comprises any of: a public land mobile network identity of the second network operator; an international mobile subscriber identification number of a user in the second virtual mobile network; a type and/or name of a service available at the first VAS provisioning network; a service provision policy applied in the first VAS provisioning network; and a condition for applying the service provision policy.

12. The apparatus of claim 9:
wherein a second VAS provisioning network is operated by the second network operator, and
wherein the instructions are such that the apparatus is operative to obtain the traffic steering information at least partially from preference information provided by the second VAS provisioning network for a user of the second virtual mobile network that is permitted for accessing the first VAS provisioning network.

13. The apparatus of claim 12 wherein the instructions are such that the apparatus is operative to provide the second VAS provisioning network with preference information for a user of the first mobile network that is permitted for accessing the second VAS provisioning network.

14. An apparatus for facilitating steering, within a first value-added service (VAS) provisioning network operated by a first network operator, of traffic from a second virtual mobile network operated by a second network operator, the apparatus comprising:
processing circuitry;
memory containing instructions executable by the processing circuitry whereby the apparatus is operative to:
generate traffic steering information based at least on requirements from the second virtual mobile network; and
provide the traffic steering information to the VAS provisioning network for generating a traffic steering policy for the traffic from the second virtual mobile network such that the first VAS provisioning network is enabled to provide differentiated VAS services to users of the first mobile network and users of the second virtual mobile network.

15. The apparatus of claim 14, wherein the traffic steering information comprises any of: a public land mobile network identity of the second network operator; an international mobile subscriber identification number of a user in the second virtual mobile network; a type and/or name of a service available at the VAS provisioning network; a service provision policy applied in the VAS provisioning network; and a condition for applying the service provision policy.

16. The apparatus of claim 14, wherein the instructions are such that the apparatus is operative to generate traffic steering information based on the requirements from the second virtual mobile network and a business agreement between the first network operator and the second network operator.

* * * * *